United States Patent [19]

Thomas

[11] 4,355,451

[45] Oct. 26, 1982

[54] RETRACTABLE DEVICE AND METHOD FOR PROVIDING TRACTION

[76] Inventor: Marvin C. Thomas, Pinewood Springs, Lyons, Colo. 80504

[21] Appl. No.: 148,874

[22] Filed: May 12, 1980

[51] Int. Cl.[3] ........................ B23P 19/02; B23P 19/04; B60C 27/20; B60C 27/14

[52] U.S. Cl. .................................... 29/426.6; 29/450; 152/214; 152/218; 152/221; 152/227; 152/244

[58] Field of Search ........... 152/213 R, 213 A, 225 R, 152/214, 216, 217, 218, 219, 221, 215, 244, 226–228; 81/15.8; 29/428, 244, 426.1, 426.2, 426.3, 426.5, 426.6, 446, 450

[56] References Cited

U.S. PATENT DOCUMENTS

| | | | |
|---|---|---|---|
| 1,578,803 | 3/1926 | Comey | 152/221 |
| 2,581,770 | 1/1952 | Pittinger | 152/216 |
| 2,720,237 | 10/1955 | Chamberlain | 152/214 |
| 3,422,870 | 1/1969 | Thomas | 152/214 |
| 3,422,877 | 1/1969 | Detweiler | 160/188 |
| 4,024,900 | 5/1977 | Thomas | 152/214 |

*Primary Examiner*—Edward C. Kimlin

*Assistant Examiner*—Thomas Bokan

*Attorney, Agent, or Firm*—O'Rourke & Harris

[57] ABSTRACT

Device and method utilizing a fixed assembly attachable to a vehicle wheel back support plate, and a journaled, rotatable assembly carrying a track which may be deployed to engage and rotate with the wheel, or retracted for stable storage. The track is supported by leading and trailing arms carried on the rotatable assembly of the device, which arms in turn are movable concentrically to the device journal to expand the track around the tire and move inwardly upon completion of the track expansion to encircle the tire. Tracks utilizing linkages and rigid traction bars, or resilient members may be employed. Deployment and retraction power may be manual or provided by springs preloadable utilizing the rotational energy of the wheel, by fluid means, i.e. hydraulic vacuum and pneumatic, or by electric power, with the deployment and retraction being powered by a common means, or with the two movements or portions thereof being powered by a combination of power means.

43 Claims, 18 Drawing Figures

RETRACTABLE DEVICE AND METHOD FOR PROVIDING TRACTION

BACKGROUND OF THE INVENTION

1. Field of the Invention

The present invention relates generally to devices and methods for selectively providing traction to a wheeled vehicle, and, more particularly, to a device and method utilizing various power sources, including fluid means, i.e. air, vacuum and liquid, rotational energy of the wheel, electric motors, or manual means, to deploy a traction track positionable adjacent to the wheel by a pair of arms mounted for rotational movement concentrically with the wheel such that the track is spaced from the tire adjacent the arms until the arms are substantially entirely through the deployment movement, whereupon the arms move radially inward and contact the track securely onto the wheel, the device being supported to the wheel by a fixed assembly and carrying the extension and retraction means on an assembly journaled to the fixed assembly.

2. Description of the Prior Art

Various traction providing arrangements have been suggested over the years. My previous patents in this area, i.e. U.S. Pat. No. 3,422,870, issued Jan. 21, 1969 and U.S. Pat. No. 4,024,900, issued May 24, 1977 are illustrative of such devices. The former discloses a pantograph linkage rotatably mounted to a backing plate and selectively extendable to engage and rotate with the tire, or retract for storage. This prior concept has proven operable and thus constitutes an advantageous approach to providing traction. However, the pantograph, being a rather rigid triangulated construction, provides little compliance with an acircular configuration, such as might be incurred when a tire goes flat or is underinflated. Thus the pantograph concept is subject to wear and deformation. Also, as the pantograph extends, the difference in radius between the track and adjacent tire becomes progressively less proportional to the degree of extension. Through the last portion of the extension, clearances are minimal and an object, i.e. mud or a stone carried by the tire, can interfere with proper deployment.

The latter patent deals effectively with the first problem by providing articulated arms to support the track, which, in portion, is resiliently positioned between the arms. However, since the track is deployed by arms positioned in an eccentric slot, linkages were provided between the arms to provide spacing of the arms as the device deploys. The plurality of arms carried in the eccentric slot, as well as provision of the eccentric slot per se, added to the weight, rigidity and complexity of the device.

SUMMARY OF THE INVENTION

The present invention, which provides a heretofore unavailable improvement over previous traction devices and methods, comprises a device in which the traction track, which may be of a resilient material, such as a urethane elastomer, or of a linkage of a solid material, such as metal, is deployed and retracted by two arms which are carried in circular grooves by, for instance, arcuate sliding members driving or driven by springs and, slaved together in the case of a spring retractable device, or arcuate pistons and cylinders, in the case of fluid devices, such that the track is initially deployed in a substantially circular manner on either side of a vertical center line through the axis, and only at the full deployment position do the arms move radially inward to engage the track adjacent the arms with the rotating wheel.

Accordingly, an object of the present invention is to provide a new and improved device and method for deploying and retracting a traction track utilizing simple and readily produced components.

Another object of the present invention is to provide a new and improved device and method for deploying a traction track essentially in a circular, concentric manner to provide flexibility during deployment.

Yet another object of the present invention is to provide a new and improved device and method for deploying and retracting a traction track which may utilize the rotational energy of the wheel, fluid energy means or electrical motors to affect the deployment and retraction.

Still another object of the present invention is to provide a new and improved device and method for deploying and retracting a traction track in which the traction track is actively attached to the deployment and retraction mechanism by two radially deformable arms adapted to ride in concentric paths substantially dependent upon one another to deploy and retract the traction track in opposite rotational directions.

These and other objects and features of the present invention will become apparent from following description.

DETAILED DESCRIPTION OF THE INVENTION

Figure 1:
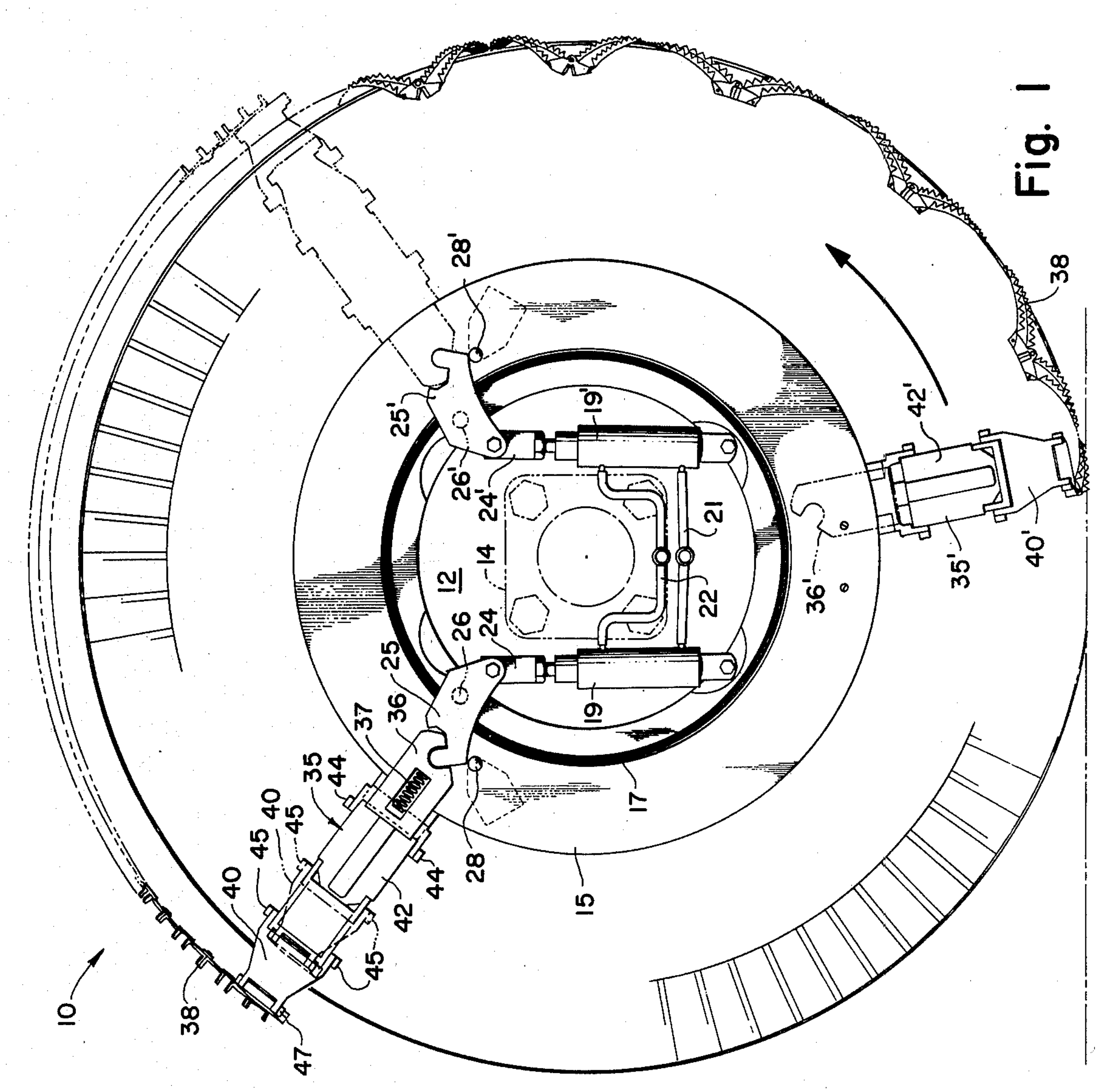
FIG. 1 is a rear view of a traction device in accord with the instant invention illustrating in partially ghosted manner the partially retracted and fully retracted configuration.

Turning now to the Drawings, wherein like components are designated by like reference numerals throughout the various FIGURES, a traction enhancing device in accord with the instant invention is illustrated in FIG. 1 and generally designated by reference numeral 10. Traction device 10 includes a fixed center assembly 12, which is attached to a stationary portion of a vehicle wheel, such as a brake backing plate carried by bearing retainer 14, or to other conventional wheel configurations. A rotatable outer assembly 15 is journaled to fixed center assembly 12, and protected by dynamic seal 17. Symmetrical actuation cylinders 19 and 19′ (the traction device is essentially symmetrical about a vertical axis and mirror image parts will be hereafter referred to by a numeral and the corresponding numeral prime) are attached to fixed center assembly 12, and each are connected to deployment line 21 and retraction line 22, which may be hydraulic or pneumatic lines and are adapted to extend and retract linkage 24 and 24′ of actuation cylinders 19 and 19′. Latches 25 and 25′, rotatably carried on pivots 26 and 26′, respectively, are movable in response to extension or retraction of linkage 24 and 24′.

Figure 2:
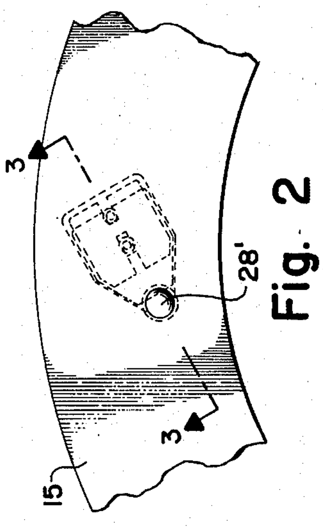
FIG. 2 is a detailed view of a ball locating member in accord with the instant invention.
Figure 3:
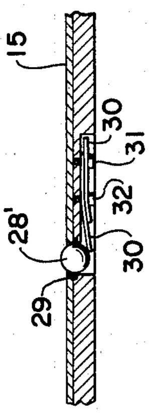
FIG. 3 is a sectional view along section line 3—3 of FIG. 2.

Spring loaded balls 28 and 28′ position latches 25 and 25′, but may be overcome by motion of actuating cylinder 19 and 19′ thereby obviating the need to maintain power or pressure in lines 21 and 22. As shown in FIG. 3, ball 28′ is positioned to extend through but be confined by opening 29 in rotating outer assembly 15. Spring arm 30 bears upon ball 28′ but serves to permit passage of latch 25′ by distending spring arm 30. Retainer 31, secured by screws 32 maintains spring arm 30 in place.

Deployment arm 35 and 35′ are slidably carried in rotatable outer assembly 15 for movement concentrically about the center of the journal between fixed center assembly 12 and rotatable outer assembly 15. Extendable track 38, illustrated as a metal linkage arrangement but operably of various configurations, is supported at the ends thereof by deployment arms 35 and 35′. Deployment arms 35 and 35′ comprise middle links 40 and 40′, and sliding members 42 and 42′, which are articulated at pivots 44 and 44′, 45 and 45′, and 47 and 47′, shown in more detail in FIGS. 9 and 10.

Figure 6:
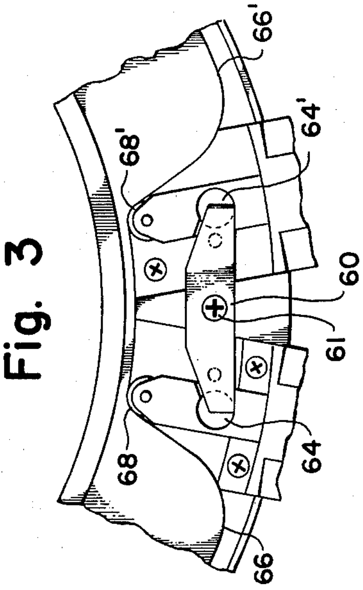
FIG. 6 is a detailed view of a latching mechanism for the deployment mechanism.
Figure 5:
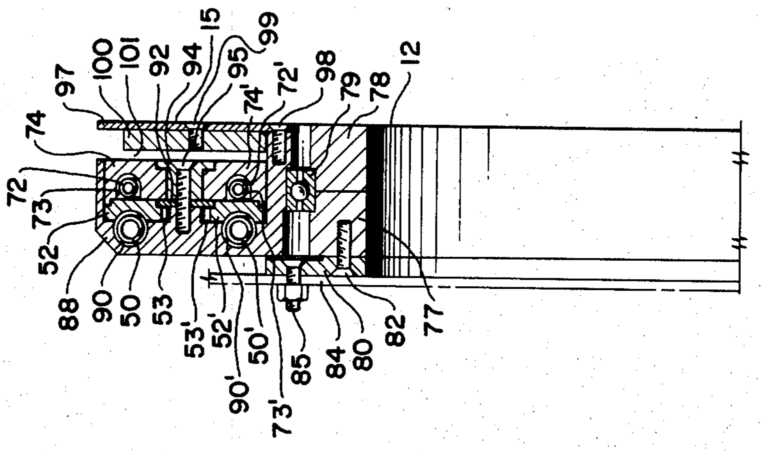
FIG. 5 is a sectional view along section line 5—5 of FIG. 4.
Figure 4:
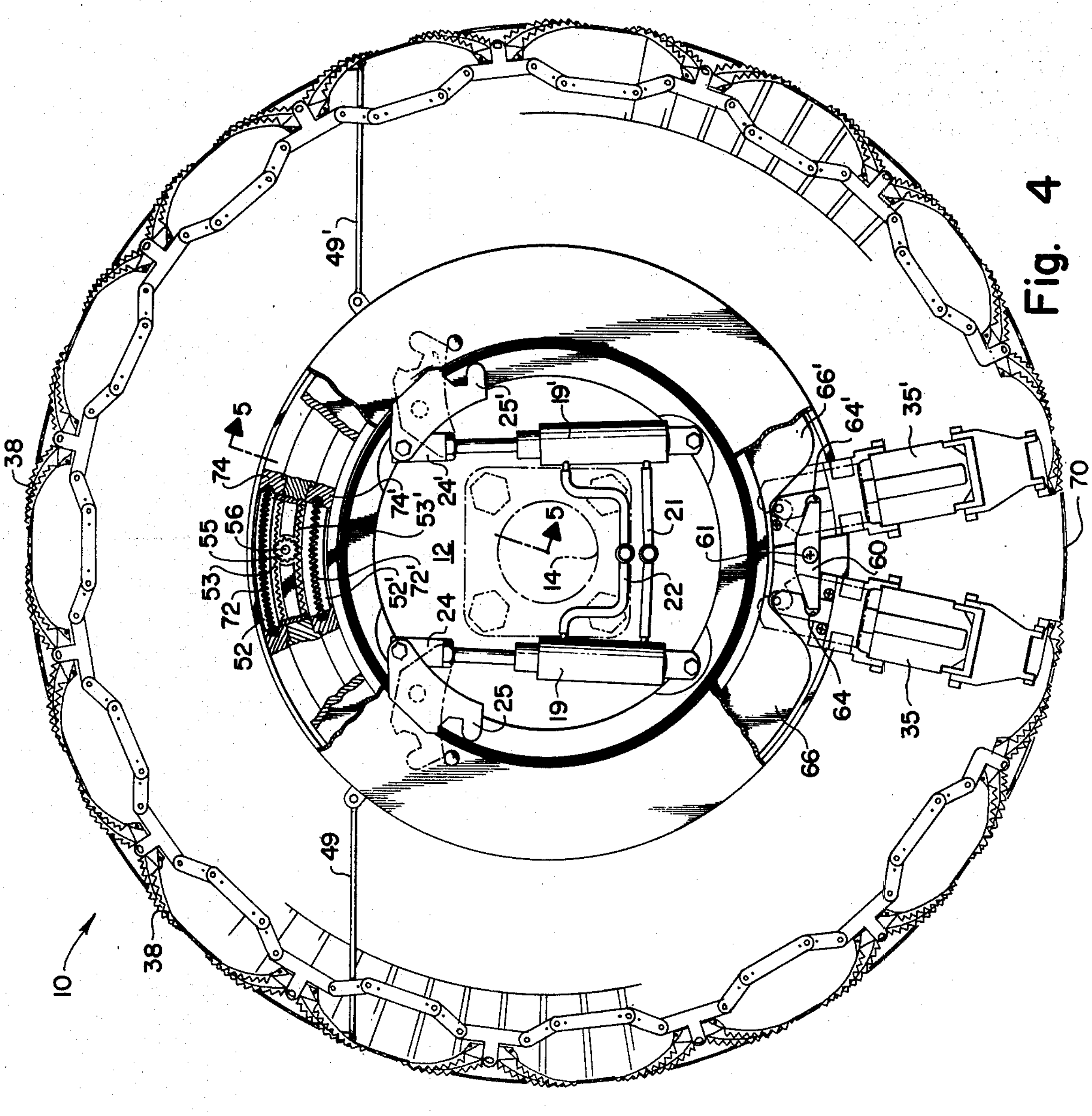
FIG. 4 is a partially cut away view similar to that of FIG. 1 illustrating the traction device in the fully deployed configuration.
Figure 8:
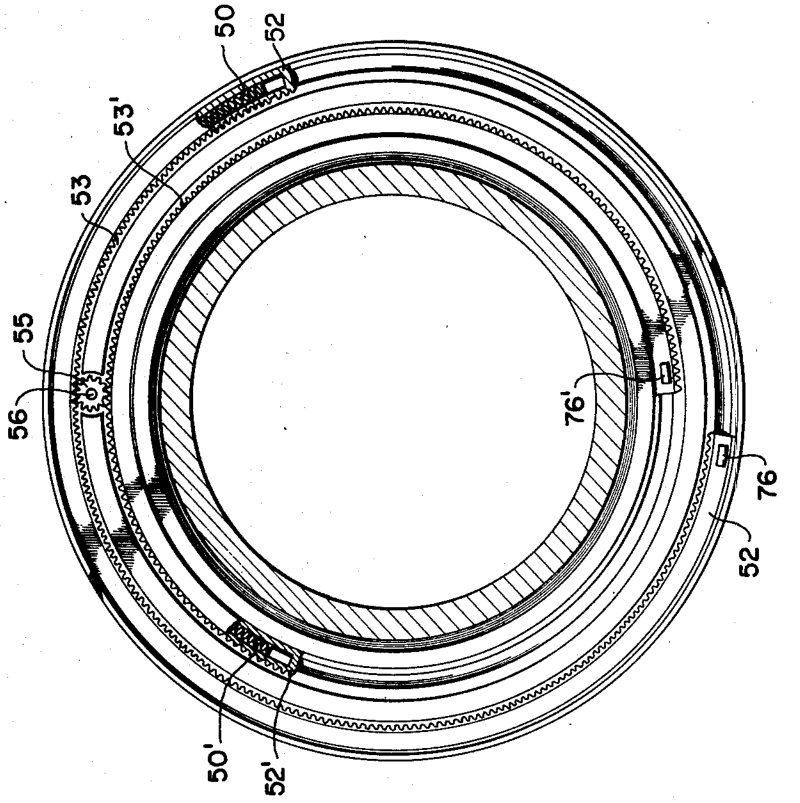
FIG. 8 is a view similar to FIG. 7 illustrating in more detail the deployment and retraction mechanism of the traction device.

Turning now to FIG. 4, whereat traction device 10 is illustrated in, in some instances, more detail in the deployed position. As shown, arms 49 and 49′ are provided to stabilize track 38. Also, it will be noted that deployment springs 50 and 50′, which bear mutually against deployment arms 35 and 35′ serve to urge arms 35 and 35′ to the deployed position when latches 25 and 25′ are retracted. With reference to FIG. 5, it will be seen that springs 50 and 50′ are carried adjacent to and bear upon arcuate members 52 and 52′, having opposed gear teeth portions 53 and 53′ which in turn are connected by spur gear 55 carried on shaft 56. Thus, as one of arcuate members 52 moves circumferentially, the other of arcuate member 52′ moves in corresponding manner in the opposite direction. Accordingly, arms 35 and 35′ are urged to the fully deployed position, whereat spring latch 60, attached to rotating outer assembly 15 by screw 61, engage openings 64 and 64′ in arms 35 and 35′. This arrangement is illustrated in more detail in FIG. 6.

Further, it will be noted that cam surfaces 66 and 66′ permit cam followers 68 and 68′ to move radially inward of traction device 10, thereby permiting sliding members 42 and 42′ to move inward and engage track 38, attached to arms 35 and 35′, with wheel 70. It is to be understood of course that the entire mechanism carried on rotatable outer assembly 15 will rotate with wheel 70. Thus traction device 10, through track 38, provides greatly enhanced traction to wheel 70.

When latches 25 and 25′ are repositioned to the retract position as illustrated in FIG. 1, it will be appreciated that latch member 36′ will ride over latch 25, but latch 25 will engage latch member 36, thereby causing spring latch 60 to release arm 35, whereupon cam follower 68 will ride up cam surface 66 thereby causing slider member 42 to extend arm 35 and release track 38 from wheel 70. As wheel 70 continues to rotate, arm 35, being captured by latch 25, will cause retraction of track 38, at least at one end. At the other end, arm 35′ will be urged to retract as a result of the interconnection of arcuate member 52′ with arcuate member 52, having gear teeth 53 and 53′ defined therein through gear 55, but since wheel 70 will, at contact with the ground, prevent retraction of arm 35′ by bearing upon track 38, compliance spring 72′ will be compressed allowing arm 35′ to rotate with wheel 70 for an interim period. However, as arm 35′ becomes free from the contact interface of wheel 70 with the ground, compliance spring 72′ will urge arm 35′ into the retracted position, thereby moving cam follower 68′ up cam face 66′, radially extending arm 35′ and moving the end of track 38 attached thereto from wheel 70, and permitting deployment arm 35′ to the retracted and latched position shown in ghosted fashion in FIG. 1.

Figure 7:
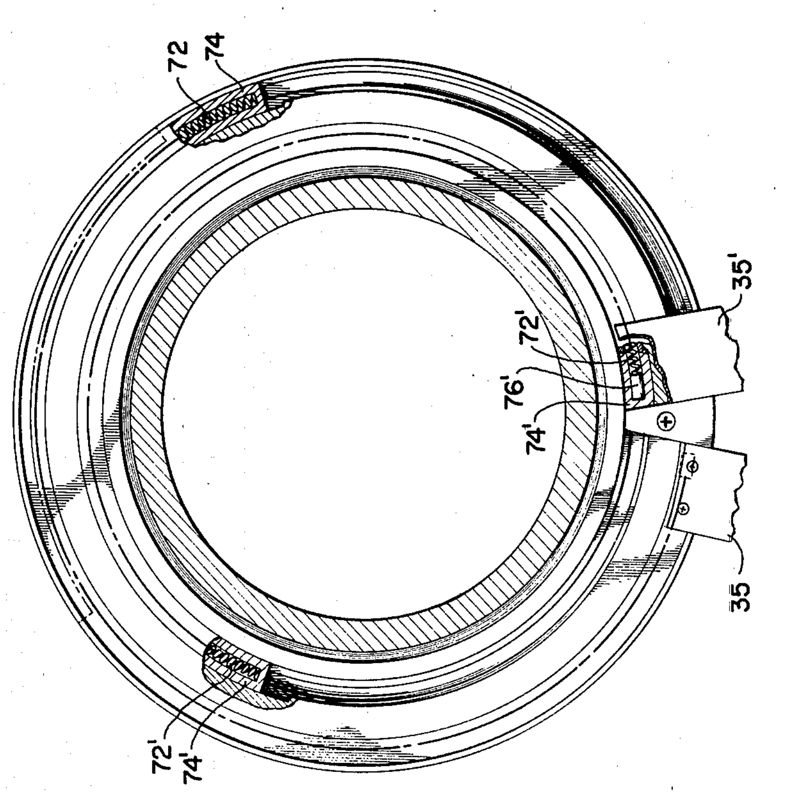
FIG. 7 is a detailed, partially cut away view of the deployment and retraction mechanism.

The actual mechanism and structure involved in the retraction, and delayed retraction, will be more readily understood with reference to FIGS. 4, 5, 7 and 8. With reference to FIG. 5, it will be noted that arcuate members 52 and 52′ are slidably disposed in rotating assembly 15. Also, compliance springs 72 and 72′, are carried in channels 73 and 73′ defined in slider members 74 and 74′. Thus, with reference to FIG. 4, when latch 25 is positioned in the retract position, shown in ghosted fashion, latch member 36 will be engaged by latch 25, as illustrated in FIG. 1, thereby terminating rotation of arm 35. As shown in FIG. 7, arm 35 is attached to slider member 74 and thus will induce, as illustrated, clockwise relative movement of slider member 74 and, as a result of abutment 76, shown in FIG. 8, will also cause arcuate member 52 to move with slider member 74. Still with reference to FIG. 8, as arcuate member 52 moves clockwise, gear 55, engaging teeth 53 and 53′, will induce a counterclockwise rotation of arcuate member 52′, i.e. that associated with arm 35′ which, as described above, is precluded from movement independent of wheel 70 as a result of track 38 being pressed against the ground, or other supporting surface, by wheel 70. Thus, as arcuate member 52' moves counterclockwise, abutment 76' will bear upon compliance spring 72' which will tend to urge slider member 74' to move therewith, but which in fact will cause compliance spring 72' to compress. At such time as arm 35' is free to move, such as when wheel 70 has rotated to the position shown approximately that of FIG. 4, the force of spring 72' will cause slider member 74' to move rapidly to the retract position as compliance spring 72' expands, whereupon latch 25' will secure the entire rotating assembly in the retracted position as shown in FIG. 1.

Thus, in summary, the force of rotating wheel 70, when latch 25 engages latch member 36, will cause deployment spring 50 to be compressed as arcuate member 52 is driven clockwise by slider member 74. At the same time, arcuate member 52' causes deployment spring 50' to compress as arcuate member 52' is driven in a counterclockwise position by gear 55, which in turn is rotated by arcuate member 52. However, since sliding member 74' is precluded from movement, compliance spring 72' is compressed by abutment 76' carried on arcuate member 52' until wheel 70 rotates to a position to permit arm 35', attached to sliding member 74', to move into the retracted position. Alternatively, deployment is accomplished by moving latch members 25 and 25' to the deployment position, as described above, whereupon deployment springs 50 and 50' will drive arcuate members 52 and 52', and sliding members 74 and 74' to the deployed position.

The details of fixed inner assembly 12, and rotating outer assembly 15, will be more readily understood with reference to FIG. 5. As shown fixed inner assembly 12, is comprised of inner retainer 77 and outer retainer 78, which serve to engage and locate bearing 79. Mounting plate 80 is secured by mounting fastener 82 to inner retainer 77 and, in turn, attaches to backing plate 84, or some other convenient fixed portion of the vehicle wheel, by fastener 85.

Bearing 79 carries rotating outer housing 88, which has defined therein spring channels 90 and 90', which carry deployment springs 50 and 50'. Locating member 92, which positions arcuate members 52 and 52', and locating member 94, which positions sliding members 74 and 74', are secured to rotating housing 88 by machine screw 95. Front plate 97, which is secured to rotating housing 88 by fastener 98, in turn is secured by fastener 99 to back plate 100, which is an extension of cam 66 and 66'. A retraction stop (not shown) for deployment arms 35 and 35' may be provided at travel limits. Deployment arms 35 and 35'move in slot 101 defined substantially by front plate 97 and sliding members 74 and 74', in conjunction with locating member 94. Wiper seals (not shown) may be provided in slot 101 if desired.

Figure 11:
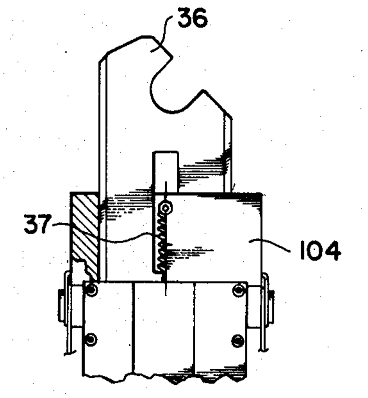
FIG. 11 is a detailed view of the latching means of the deployment arm of the instant invention.
Figure 10:
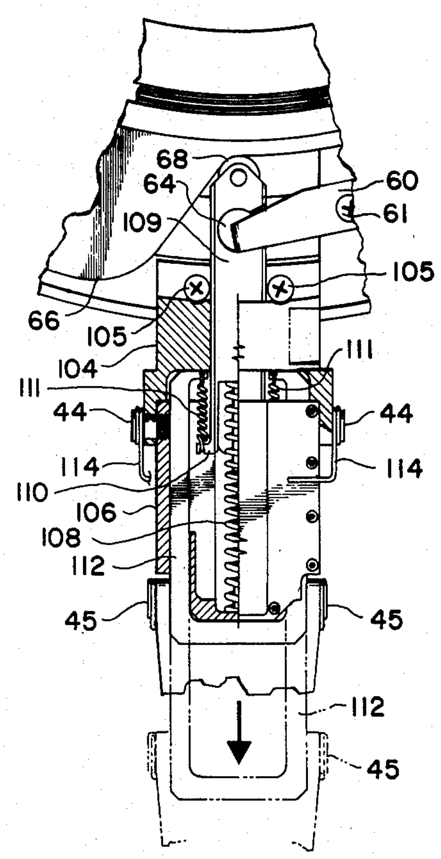
FIG. 10 is a detailed view of the deployment arm of the traction device.
Figure 9:
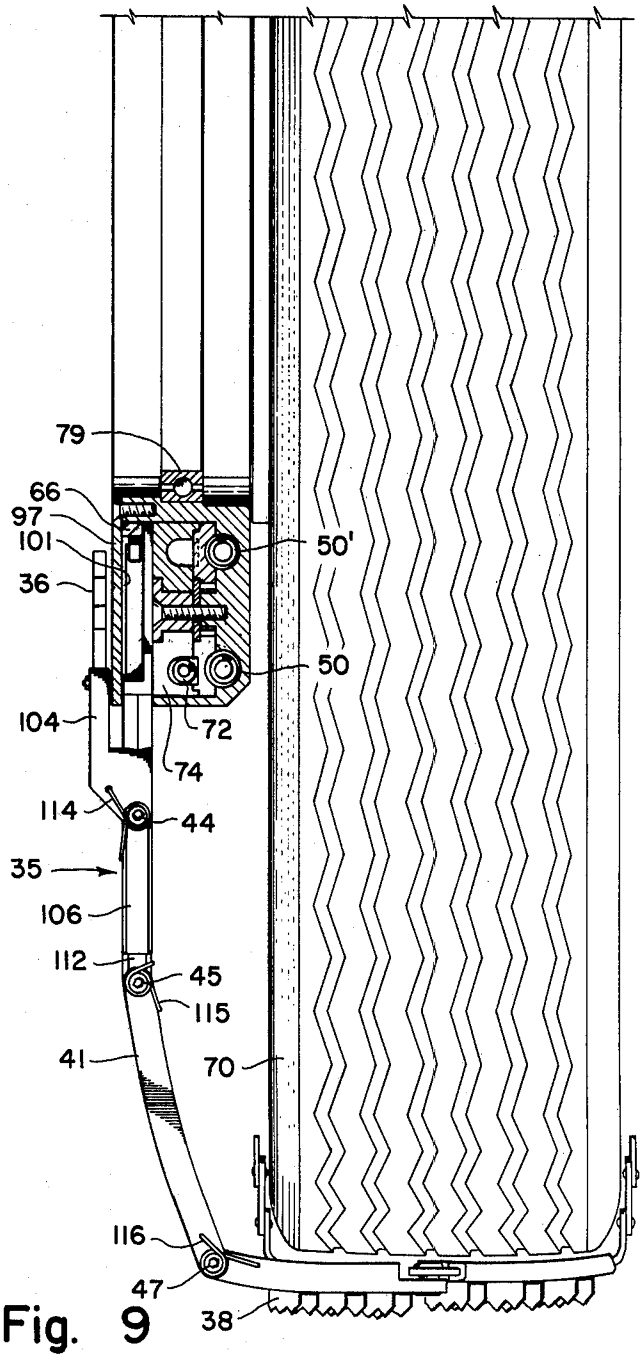
FIG. 9 is a partially sectioned view of the traction device in accord with the instant invention.

The relationship of deployment arm 35 and 35' relative to rotating outer portion 15 and track 38 will be more readily understood with reference to FIG. 9, FIG. 10 and FIG. 11. As shown in FIG. 10, deployment arm attachment member 104 is secured by fasteners 105 to slider 74. Fixed slider member 106 is attached to attachment member 104 by pivot 44. Cam spring 108 is carried between fixed slider member 106 and urges cam follower support 109 towards cam 66. Cam follower support 109 also carries spring supports 110 which carry one end of compliance springs 111 with the other end of compliance springs 111 being attached to movable slider member 112. In this manner, as cam follower 68 moves up cam surface 66, cam follower support 109 is moved radially outward thereby compressing cam spring 108 and, through compliance springs 111, urging movable slider member 112 to the position shown in a ghosted manner in FIGS. 1 and 10, and thereby moving track 38 from wheel 70.

As is shown in FIG. 9, hairpin springs 114, 115 and 116, carried at pivots 44, 45 and 47 bias deployment arm 35 towards wheel 70 at such pivot points, thereby providing for a fixed nominal positioning of track 38 while affording appropriate compliance for positioning of track 38. In the event wheel 70 should deform, such as as the result of a flat tire, in addition to deformity at compliance springs 111, a certain amount of compliance may also be accomplished at pivots 44, 45 and 47. Also, the articulation provided by such pivots permits track 38 to center itself on wheel 70 even if the cross section of wheel 70 changes somewhat such as might result from change in size or type of tire.

FIG. 11 illustrates the mechanism which permits latch member 36, as shown in FIG. 1, to move over latch 25'. As shown, spring 37 is connected between latch member 36 and arm attachment member 104 thereby permitting telescoping of latch member 36 into arm attachment member 104 as latch member 36 rides over latch 25'. Of course, when latch member 36 engages latch 25, i.e., the mirror image latch intended to cooperate with latch member 36, the two members are locked together as shown in FIG. 1.

Figure 13:
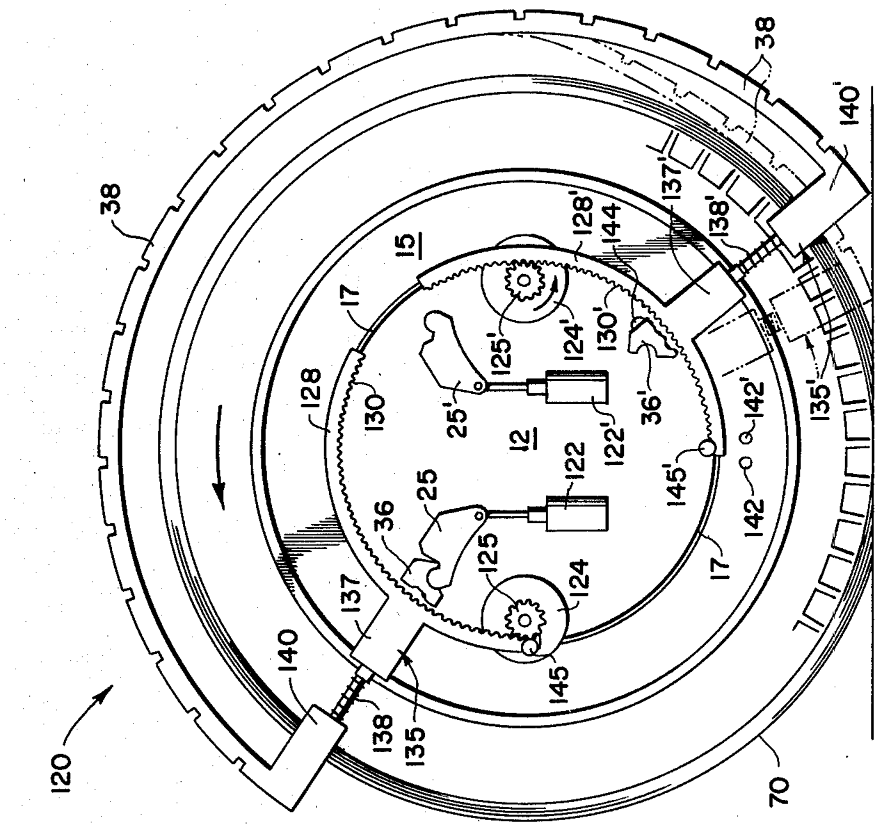
FIG. 13 is a view similar to that of FIG. 12 illustrating the electric motor embodiment of the instant invention in the partially retracted position.
Figure 12:
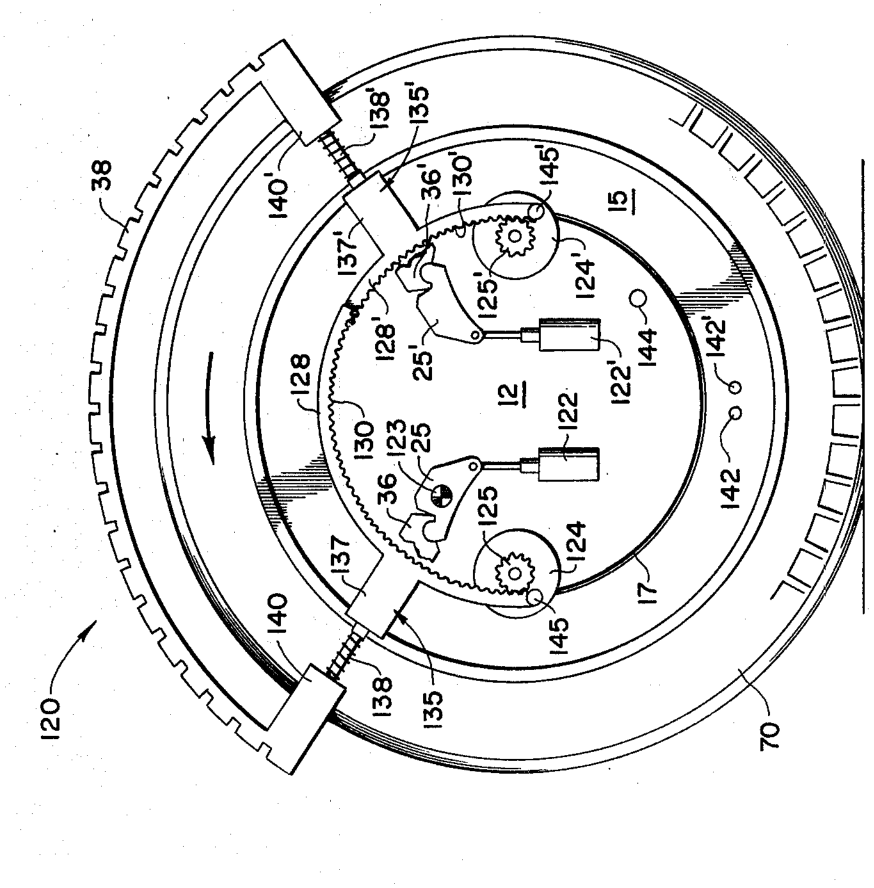
FIG. 12 is a simplified side view illustrating yet another embodiment of the traction device of the instant invention employing electric motors.

Another embodiment of the invention is illustrated in FIGS. 12 and 13 whereat traction device 120, which is fundamentally similar to previously described traction device 10, is shown. As illustrated, fixed center portion 12, rotatable outer portion 15, seal 17, latches 25 and 25' and latch members 36 and 36' are substantially as described before but are adapted to activate switch 123. However, solenoids 122 and 122' are substituted for actuating cylinders 19 and 19' described above. Also, motors 124 and 124', which preferably are electric motors, are carried in rotating outer portion 15. Motors 124 and 124' include gears 125 and 125' supported on the output shaft thereof. Curved racks 128 and 128', which may be thought of as analogous to slider members 74 and 74', described above, with gear teeth 130 and 130' defined thereon and engaging drive gears 125 and 125', are also supported for movement in rotating outer portion 15.

Deployment arms 135 and 135' are carried on curved racks 128 and 128', again in a manner similar to that described above. Deployment arms 135 and 135' include solenoids 137 and 137' which, when activated, contract to move track 38 into conjunction with wheel 70, and when extended move deployment arms 135 and 135', and thus track 38, away from wheel 70. Also, relief springs 138 and 138' are provided on deployment arms 135 and 135' respectively to enable radial forces applied to deployment arms 135 and 135' to be accommodated without damage. Track support members 140 and 140' carry track 38 at the termini of deployment arms 135 and 135' respectively. Proximity switches 142 and 142', which may of course be contact switches or other such means, are positioned on rotating outer portion 15 of traction device 120 to activate solenoids 137 and 137', respectively, when deployment of traction device 120 is complete. A similar switch 144 is interposed in the curcuiting of solenoid 137' and operates as will be described below.

Operation of traction device 120 will be understood with reference to FIGS. 12 and 13. To deploy track 38, solenoids 122 and 122' are activated to position latches 25 and 25' in the release position and, as a result of such movement close switch 123 thereby powering motors 124 and 124'. Drive gears 125 and 125', carried on motors 124 and 124', thus drive curved racks 128 and 128' to the deployment position. As deployment arms 135 and 135' reach the fully deployed position, switches 142 and 142' are activated. It is to be understood of course that deployment arms 135 and 135' may operate substantially independent of one another. Thus, if one of deployment arms 135 and 135' should be "run over" by wheel 70, the appropriate of relief springs 138 and 138' will radially deform to accomodate such condition. Motors 124 and 124' are of such a nature as to not be harmed by operation in a stalled condition, and thus the deployment is temporarily stopped until deployment arm 135 or 135' is again released from confinement by wheel 70 and permitted to continue deployment. Thus, with the understanding that switches 142 and 142' will not be necessarily activated concurrently, it will be recognized that deployment arms 135 and 135' will, upon activation of switches 142 and 142', terminate operation of corresponding motor 124 and 124', and concurrently activate corresponding solenoid 137 or 137' to overcome spring 138 or 138' and engage track support member 140 or 140' firmly against wheel 70. When both of switches 142 and 142' have been activated, track 38 carried on track support members 140 and 140' will be firmly in place against wheel 70.

Retraction of traction device 120 will be more readily understood with reference particularly to FIG. 13. When solenoids 122 and 122' are activated to position latches 25 and 25' for retraction as illustrated, latch member 36 will be captured by latch 25 thereby activating switch 123 upon impact and causing motor 124, through drive gear 125, to initiate movement of curved rack 128 to the retracted position. While solenoid 137 will immediately activate to move track support 140 away from wheel 70, solenoid 137' is maintained in contact with wheel 70 until a position adjacent switch 144 in fixed center portion 12 is reached by latch member 36' whereupon solenoid 137' and motor 124' will be activated to move track support member 140' away from wheel 70. In this manner solenoid 137' will not be urging track support member 140' away from the wheel 70 while wheel 70 pins track support member 140' to the ground. Motors 124 and 124' continue to drive curved racks 128 and 128', and attached deployment arms 135 and 135' until corresponding limit switches 145 and 145' reach a preselected position indicating complete retraction whereupon operation of motor 124 or 124' is terminated.

The ability to directly energize and stall motors 124 and 124' clearly simplifies the traction device. Various intermediate arrangements readily come to mind. For instance, with regard to traction device 10 of FIG. 1, if deployment springs 50 and 50' were omitted while maintaining compliance springs 72 and 72', a motor driving spur gear 55 would readily operate the traction device 10. Similarly, though substantially less convenient, operation of spur gear 55 manually would serve to deploy and retract traction device 10, as would manual operation of drive gears 125 and 125' with regard to traction device 120. Also, it will be apparent that the mechanical activation of deployment are 35 and 35' of traction device 10 as illustrated in FIGS. 1 through 11 could be employed in place of deployment arms 135 and 135' of traction device 120 by a relatively simple substitution. Conversely, deployment arms 135 and 135', utilizing solenoids 137 and 137', could be directly substituted for deployment arms 35 and 35'. Thus in many regards the various subcomponents of the differing illustrated embodiments of the invention can be independently utilized in other embodiments of the invention.

Still another embodiment of the invention is illustrated in FIGS. 14 through 17 wherein traction device 150 is illustrated. As with traction device 120 previously discussed, traction device 150 employs a substantial number of components essentially as described with regard to traction device 10. For instance, fixed center portion 12 and rotatable outer portion 15 are included, as are actuating cylinders 19 and 19'. Latches 25 and 25' are similarly operated as discussed above, except that latch 25 includes sleeve valve 152 which will be discussed in more detail below. Latch members 36 and 36', track 38 and wheel 70 are also quite similar.

Figure 14:
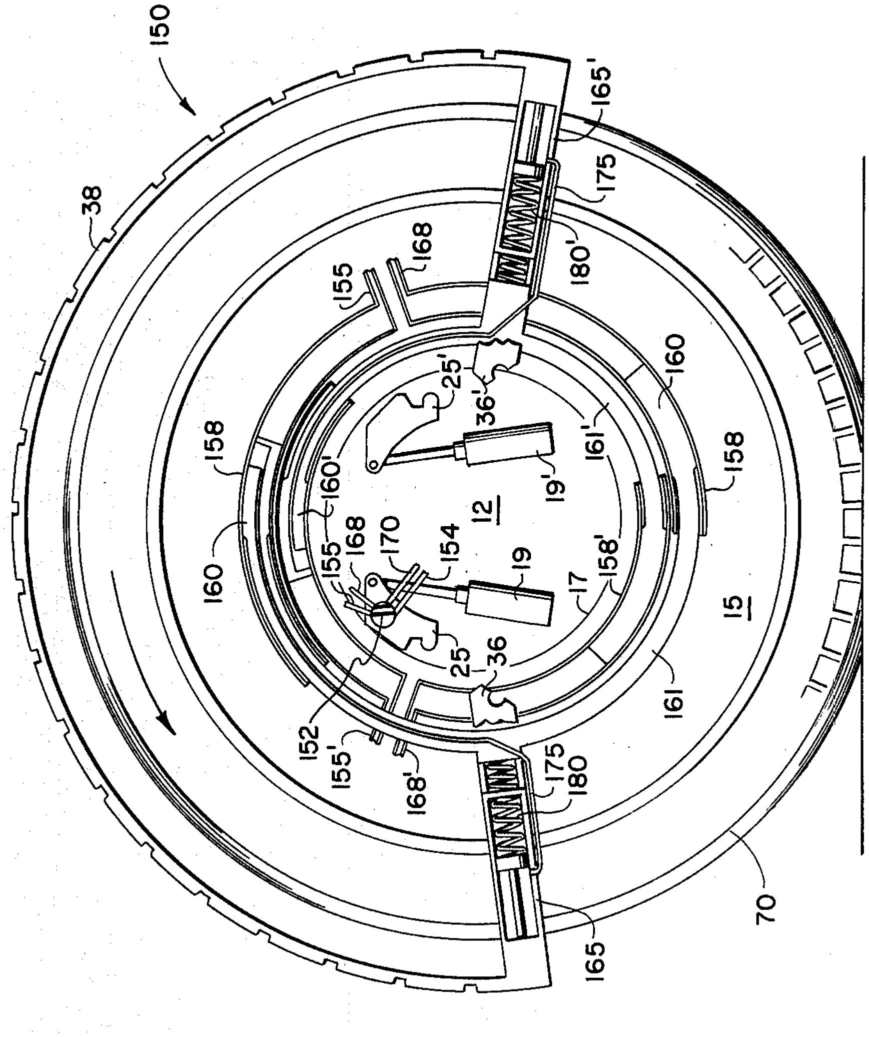
FIG. 14 is a simplified, in places schematic, side view of yet another embodiment of the instant invention utilizing fluid working media to power the traction device.

Referring now to FIG. 14, the structure of traction device 150 will be discussed with particular attention to the deployment mode. As shown, latches 25 and 25' are positioned for deployment. Such positioning of latch 25 aligns sleeve valve 152 such that pressure line 154, which communicates with a source of pressurized fluid, either hydraulic or pneumatic, communicates with first fluid line 155, which in turn, through a dynamic seal and manifold (not shown) between fixed center portion 12 and rotating outer portion 15, with remote portions of fluid lines 155 and 155', in rotating portion 15. As shown, fluid lines 155 and 155' communicated with the interior of arcuate cylinders 158 and 158', shown in sections for purposes of illustration. Within arcuate cylinders 158 and 158' are positioned arcuate pistons 160 and 160' respectively. The center portions of arcuate pistons 160 and 160' include a connecting shaft portion 161 and 161' upon which deployment arms 165 and 165' and carried. Thus it will be seen that a pressurized fluid from pressure line 154 will communicate through lines 155 and 155' to conduct the pressurized fluid to the interior of arcuate cylinders 158 and 158' to bear upon the ends of arcuate pistons 160 and 160' and thus to in turn urge arcuate pistons 160 and 160' to move to the deployed position carrying deployment arms 165 and 165' therewith. At the other extreme of arcuate cylinders 158 and 158', second fluid line 168 and 168' communicate therewith and, in turn, conduct fluid expelled from arcuate cylinders 158 and 158' through sleeve valve 152 to fluid return line 170. In the event of a pneumatic system, the fluid may be vented to the atmosphere, though of course in a hydraulic system the fluid would be returned to a reservior.

Figure 15:
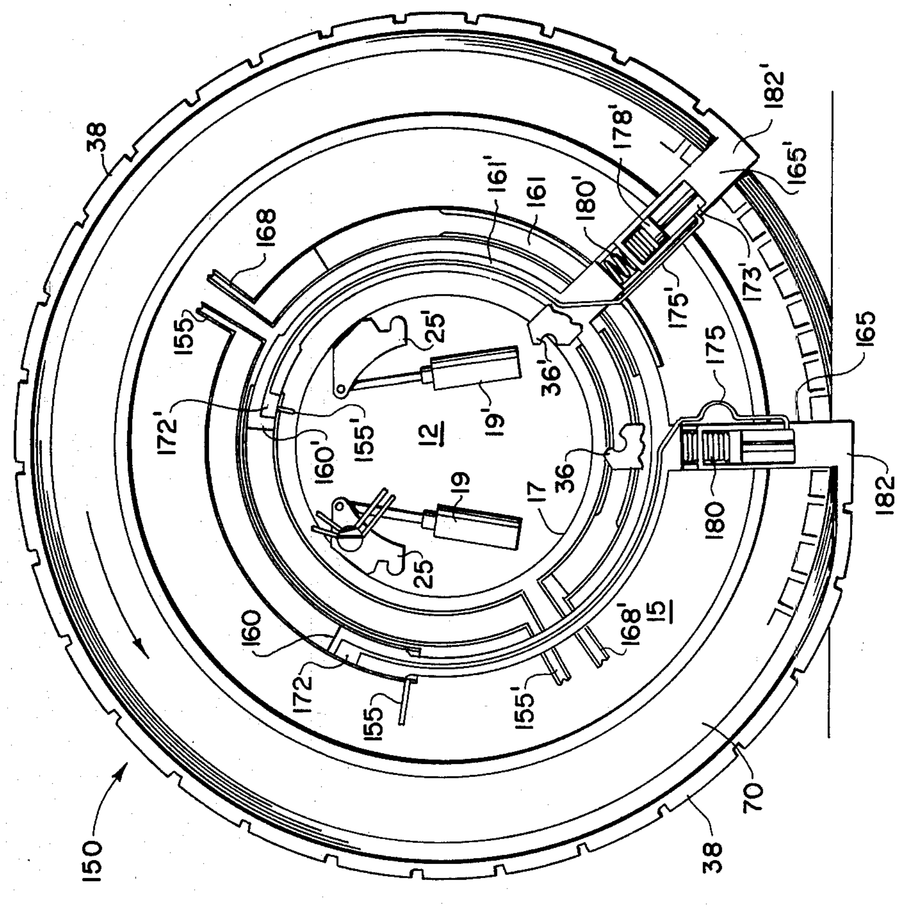
FIG. 15 is a view similar to FIG. 14 illustrating the subject embodiment in the partially deployed position.

Turning now to FIG. 15, it will be noted that arcuate piston 160' has reached the full deployment travel at which position another branch of first fluid line 155' communicates with port 173', which in turn permits pressurized fluid to travel through line 175', defined in part within arcuate piston 160' to deployment arm cylinder 172' where piston 178' is urged to compress compliance spring 180', thereby causing track attachment member 182' of deployment arm 165' to move inward and contact wheel 70.

On the other hand, arcuate piston 160 has not reached the full travel to align port 172 with first fluid line 155 since deployment arm 165 is, as illustrated, caught between wheel 70 and the supporting surface. However, as shown, spring 180 is compressed by the weight of wheel 70 bearing upon the supporting surface thereby accommodating the radial force imposed upon deployment arm 165. Of course when arcuate piston 160 reaches its extreme position, port 172 will align with the adjacent portion of first fluid line 155 thereby pressurizing line 175 to urge track support member 182 into contact with wheel 70, at which time track 38 will be fully deployed and in a stable operating condition.

Figure 16:
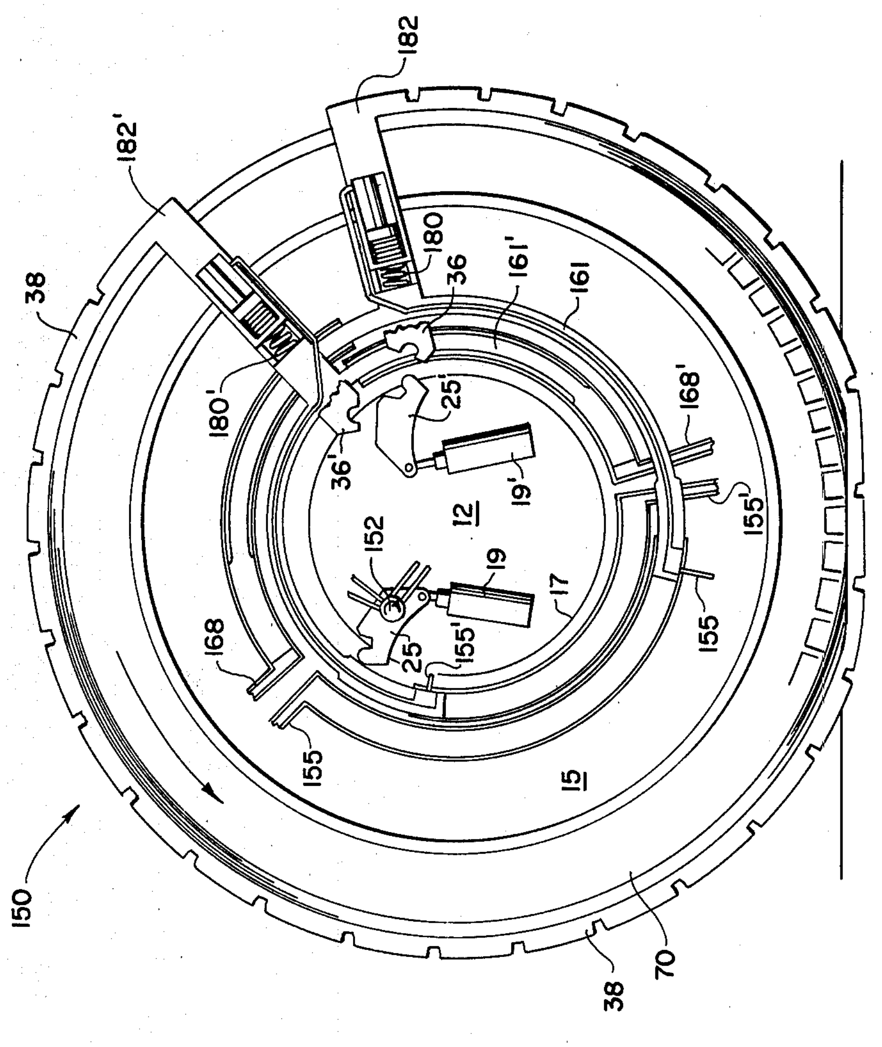
FIG. 16 is a view similar to that of FIGS. 14 and 15 illustrating the embodiment in the fully deployed position with incipient retraction of the traction track.

When traction device 150 is to be retracted, as shown in FIG. 16, latch 25 is rotated to an intercept position for latch member 36, with sleeve valve 152 slowly 152 slowly rotating to a new alignment in a delayed action manner. Actuating cylinder 19' is valved to move more slowly than actuating cylinder 19 when moving to the retracted position, and therefore latch 25', though moving into the intercept position, is lagging behind the movement of latch 25. Thus at the time of incipient retraction, as illustrated in FIG. 16, track support members 182 and 182' are still firmly in contact with wheel 70, and pressure is maintained in the various branches of first fluid line 155.

Figure 17:
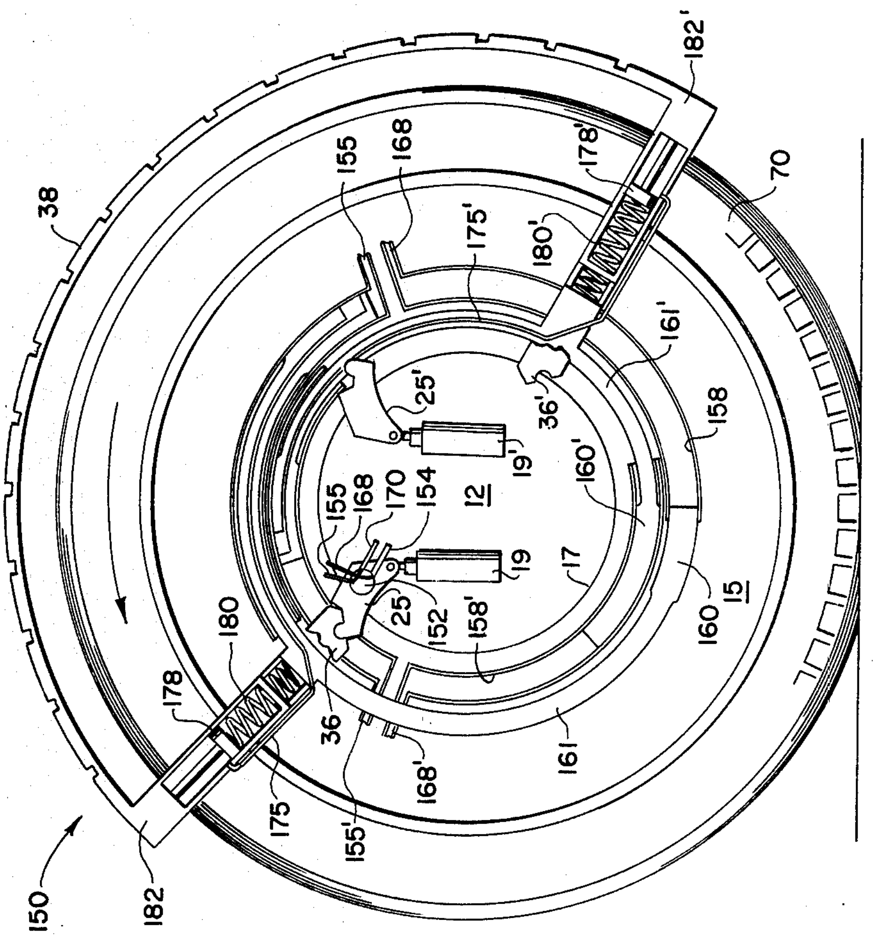
FIG. 17 is a view operationally sequential to that of FIG. 16 illustrating the device in the partially retracted position.

At such time as sleeve valve 152 fully rotates to the retract mode setting, as shown in FIG. 17, latch 25 has intercepted latch member 36. The valving arrangement of sleeve valve 152 is such that pressure source line 154 is now in communication with second fluid line 168 while exhaust line 170 is in communication with first fluid line 155. Accordingly, pressure is quickly relieved from lines 175 and 175' causing pistons 178 and 178' to be urged by springs 180 and 180' to the extended position, thereby moving track attachment members 182 and 182' away from wheel 70. Concurrently, fluid under pressure from pressure source line 154 is conducted through second fluid line 168 and 168' to the interior of arcuate cylinders 158 and 158' thereby inducing a pressure condition on the opposite ends of arcuate pistons 160 and 160' than that shown in FIG. 14. Such pressure conditions cause arcuate pistons 160 and 160' to move to the retract position whereat latch member 36' is engaged by latch 25' to secure traction device 150 in the retracted position, though of course pressure may be maintained on arcuate pistons 160 and 160' if desired.

While the above embodiment of traction device 150 has been described and illustrated in a simplified manner to enhance clarity of a somewhat involved mechanism, it is to be understood that a number of variations are readily accomplished. For instance, arcuate cylinders 158 and 158' could be axially spaced around the center of rotation rather than radially spaced as illustrated. It may be desirable to position ball valves (not shown) in ports 172 and 172' which open when pistons 160 and 160' are adjacent first fluid line 155 and 155'. With apparent changes in valving, a vacuum source could replace the pressure source. Other hybrid arrangements could also be utilized. For instance, the fluid pressure could be utilized for deployment with such deployment compressing a return spring to provide for failsafe retraction should the pressure source fail. Of course the deployment arm arrangement from traction device 10 utilizing cams and springs could readily replace the deployment arms 165 and 165' of traction device 150. Again it is seen that a number of combinations of the various subassembly and activation means may be readily interchanged between traction device 10, traction device 120 and traction device 150.

Figure 18:
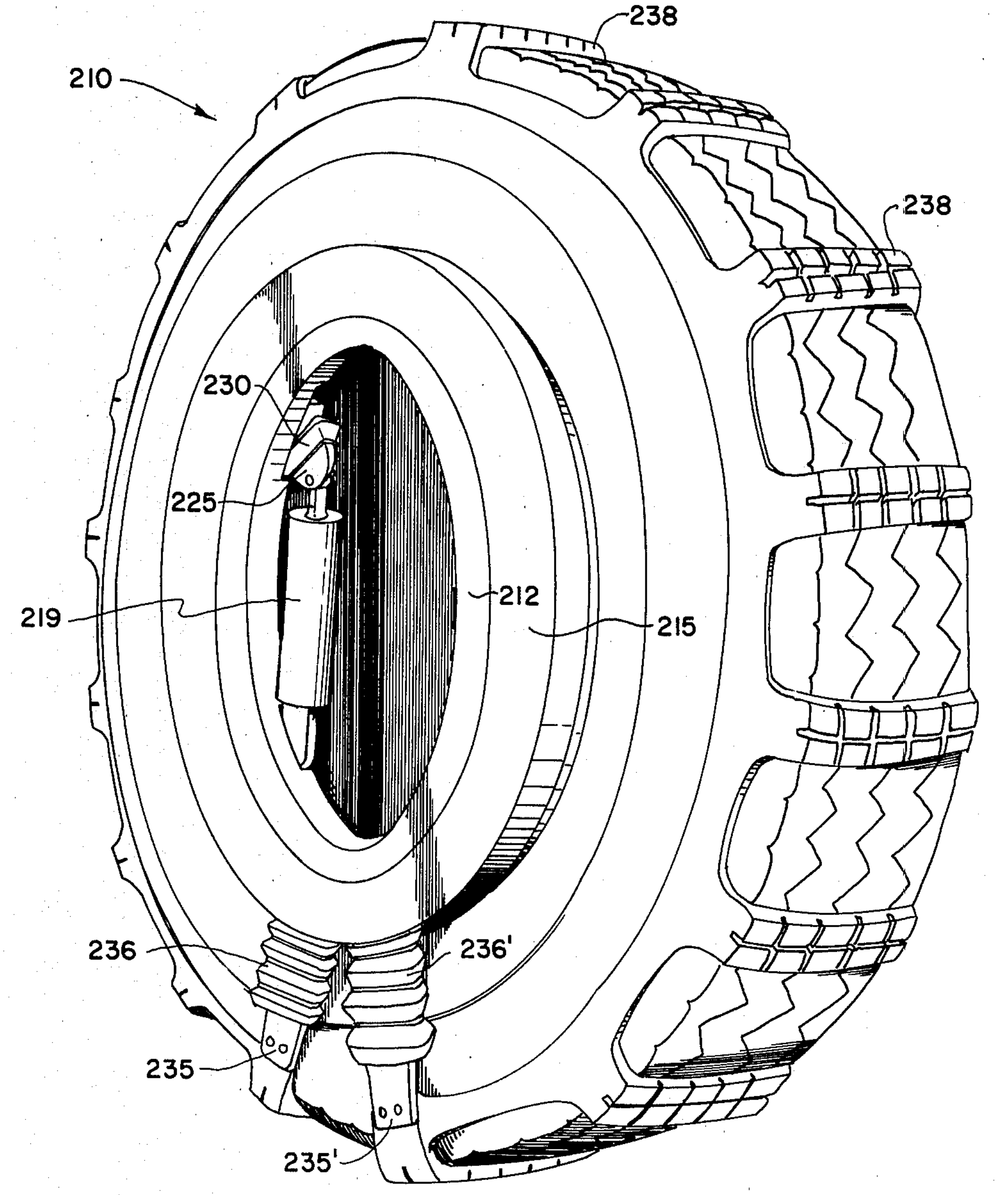
FIG. 18 is a perspective view of a traction device including an embodiment of the instant invention utilizing a unitary, elastomeric track and internal latch means.

An idealized representation of the device in accord with the instant invention is illustrated in FIG. 18 and generally designated as traction device 210. Again, a fixed center portion 212 and rotating outer portion 215 are provided substantially in the manner earlier discussed. However, latch 225 is positioned substantially internally and covered by boot 230. In a similar manner, deployment arms 235 and 235' are protected by boots 236 and 236'. Track 238 is illustrated as being a fully elastomeric track, though metal reinforcing members may be incorporated within the track at positions of stress concentration. It is also possible to fully enclose traction device 210 with a single boot molded in the retracted position with accordion pleats to accommodate deployment. Those skilled in the art will readily appreciate that the entire mechanism may be protected from the environment. Also, in the case of metal parts, a surface impregnation of, for instance, polytetrafluoroethylene may be desirable to provide lubrication and an oleophilic surface resistant to ice and snow adherence.

In summary, the instant invention involves a simplified traction device in which a number of actuating means or subsystems may be employed in a great number of combinations and permutations, ranging from manual activation through mechanical spring power, electric motors, fluid means or vacuum means. A pair of deployment arms, mounted for concentric movement around a fixed portion simply extends or stretches a track around a wheel, or readily retracts the mechanism from the wheel.

Although only limited preferred embodiments of the invention have been illustrated and described, it will of course be recognized that a great number of further alternative combinations and variations of the invention will be apparent to those skilled in the art, and that the invention is not intended to be limited except by the following claims.

What is claimed is:

1. A traction apparatus for a vehicle wheel, comprising:

mounting means adapted to be fixedly supported adjacent a rotatable vehicle wheel;

an outer assembly rotatably carried by the mounting means at a journal positioned substantially concentric to the rotation of the vehicle wheel;

a pair of deployment arms mounted on the outer assembly for concentric movement around the center of rotation of the journal and extending radially from the outer assembly;

an expandable and retractable track supported by the traction apparatus substantially by suspension between the ends of the two deployment arms;

means positioned substantially internally of the rotatable outer assembly to selectively drive the deployment arms in opposite rotational directions from a retracted to a deployed position and back to the retracted position; and means to radially extend and retract the deployment arms as a function of the position thereof relative to the rotatable outer assembly, whereby the track may be encircled around the wheel by driving the deployment arms in one direction, and secured to the wheel by moving the deployment arms radially inward at such position, or, alternatively, the track may be retracted and stored by moving the track away from the wheel by radially extending the deployment arms and rotating the deployment arms to store the track in a retracted position.

2. A traction apparatus as set forth in claim 1 in which the means to drive the deployment arms comprise spring means positioned between each deployment arm and the rotating outer assembly, and movable latch means secured on the mounting means to capture the deployment arms and distend the spring means, whereby the deployment arms may be moved to the deployed position by releasing the latch means and permitting the springs means to assume a less distended position, and, by repositioning the latch means to capture the deployment arms and distent the spring means.

3. A traction apparatus as set forth in claim 2 in which the deployment arms are each carried on an arcuate slider member secured one each in an arcuate groove defined in the rotating outer assembly, with each arcuate slider member being operably connected to an elongated retraction spring positioned in the rotating outer assembly, the retraction spring comprising the spring means.

4. A traction apparatus as set forth in claim 3 in which a pair of arcuate gear members are also carried one each in each groove with a slider member, the arcuate spring members being operationally connected for movement in an opposite rotational direction by intermediate gear means therebetween, and further including relief springs operably connecting the slider members to the arcuate gear members, whereby the slider members may move independently of the arcuate gear members by compressing the relief spring.

5. A traction apparatus as set forth in claim 4 in which the intermediate gear means, retraction spring and relief spring and slider member for each deployment arm are mutually disposed in the common arcuate groove defined in the rotating outer assembly, with each groove being radially displaced one from the other and in which a spur gear comprising the intermediate gear means is disposed therebetween to concurrently engage the gear teeth of each arcuate gear member.

6. A traction apparatus as set forth in claim 1 in which the means to drive the deployment arms comprise at least one electric motor operably connected to the deployment arms.

7. A traction apparatus as set forth in claim 6 in which a pair of electric motors having output shafts are mounted to the rotating outer assembly and include drive gears at the output shafts of the electric motors, and in which the deployment arms are carried out each on a curved rack slidably positioned in an arcuate groove defined in the rotating outer assembly, with the drive gear of each motor engaging the corresponding gears of each curved rack.

8. A traction apparatus as set forth in claim 1 in which the means to drive the deployment arms comprise fluid drive means operated by a fluid working media.

9. A traction apparatus as set forth in claim 8 in which the fluid drive means comprise a fluid working media available at a pressure differing from ambient, a pair of cylinders defined in the outer rotating assembly, a pair of pistons each operably connected to one deployment arm and disposed movably in a cylinder, first and second inlet means connected to each cylinder with inlet means at opposite ends thereof, and valve means to selectively connect the working fluid with one of the inlet means into the cylinders, whereby the piston and attached deployment arms may be selectively positioned.

10. A traction apparatus as set forth in claim 9 in which the cylinders are arcuate in shape, and in which the pistons are of a complimentary arcuate shape with the deployment arms being attached one each to each piston, and in which the valve means comprise a sleeve valve rotatable to selectively connect the fluid working media with the inlet means.

11. A traction apparatus as set forth in claim 1 in which the means to radially extend and retract the deployment arms comprise at least one cam surface having a radially depressed and a radially raised portion carried on the outer assembly, at least two telescoping members comprising at least a portion of each deployment arm, the members telescoping in a radial direction, a cam follower operably connected to the outer of the telescoping members and adapted to ride upon the cam surface, and spring means connected between the telescoping members and the cam follower to urge the telescoping members into a radially retracted position to position the deployment arm inwardly when the cam follower is in the depressed portion of the cam surface, but distendable to permit radial extension of the deployment arm as the cam follower urges the telescoping members apart as the cam follower moves along the cam surface to the raised portion thereof.

12. A traction apparatus as set forth in claim 11 in which the telescoping members further include compliance springs connected between the telescoping members to permit telescoping movement of the deployment arm when a force is applied radially inward at the interface of the track and deployment arm.

13. A traction apparatus as set forth in claim 1 in which the means to radially extend and retract the deployment arms each comprise at least two telescoping members comprising at least a portion of the deployment arm and arranged to telescope in a radial direction, a solenoid connected to the telescoping members and adapted to urge the telescoping to one of the extended and retracted positions, and biasing means connected to the telescoping members and adapted to urge the telescoping members to the other of the extended and retracted positions.

14. A traction apparatus as set forth in claim 13 in which switch means are positioned on the rotating assembly and connected to the solenoid to radially retract the deployment arm when the deployment arm is adjacent the switch means.

15. A traction apparatus as set forth in claim 1 in which the means to radially extend and retract the deployment arm comprise at least two telescoping members comprising a portion of the deployment arm and adapted to telescope in the radial direction, a cylinder defined in one of the telescoping members, a piston positioned within the cylinder, biasing means adapted to urge the telescoping members to one of the extended or retracted positions, and port means adapted to be connected to a working fluid and positioned to urge the piston and attached telescoping members to the other of the extended or retracted positions.

16. A traction apparatus as set forth in claim 15 in which valve means are included in the port means to connect and disconnect the working fluid with the port means as a function of the position of the deployment arm relative to the rotating outer assembly.

17. A traction apparatus as set forth in claim 1 in which the track comprises a elastomeric track extending between the deployment arms and stretchable to encircle a vehicle wheel as the deployment arms are driven in mutually opposite rotational directions to the deployed position, and resilient to contract as the deployment arms are driven in mutually opposite rotational directions to the retracted position.

18. A traction apparatus as set forth in claim 1 in which the track means comprise a metal linkage assembly.

19. A traction apparatus for a wheeled vehicle, the apparatus comprising:

mounting means adapted to be secured adjacent a vehicle wheel;

an outer rotating assembly surrounding the mounting means and journaled thereto at a position substantially concentric to the center of rotation of the vehicle wheel;

two grooves each in the form of at least a partial circular configuration defined in the rotating assembly;

a pair of arcuate slider members positioned one each for movement within the grooves;

a pair of deployment arms mounted one each upon the slider members and extending radially outward therefrom;

a pair of arcuate gear members positioned one each within the grooves with the gear teeth defined thereon facing together;

a pair of deployment springs positioned one each in the grooves and abutting against the corresponding arcuate gear member and the rotating assembly;

a pair of compliance springs positioned one each in the grooves and abutting the slider member and the arcuate gear in such groove;

a spur gear rotatably mounted to the rotating assembly and engaging the teeth of both arcuate gears;

a length of extendable and retractable track connected at each end to one of the deployment arms;

means to radially extend and retract the deployment arms as a function of the position thereof relative to the rotating assembly;

a pair of latches pivotally mounted to the mounting means in mirror image fashion therefrom and movable to retract and deployment orientations;

a pair of latch members extending one each from the deployment arms and adapted to engage the corresponding latch when the latch is in a retract orientation; and means to selectively move the latches to retract and deployment orientations.

20. A traction apparatus as set forth in claim 19 in which the means to radially extend and retract the deployment arms comprise a cam surface carried on the rotating assembly and eccentric relative to the center rotation, a pair of telescoping members comprising a portion of each deployment arm, a cam follower operably connected to one of the telescoping members and adapted to ride upon the cam surface, and spring means connected between the telescoping members and the cam follower to bias the telescoping members towards the cam surface.

21. A traction apparatus for a vehicle wheel, the apparatus comprising:

mounting means adapted to be secured adjacent a vehicle wheel;

an outer assembly positioned around the mounting means and journaled thereto around a center of rotation substantially concentric to the center of rotation of the vehicle wheel;

a pair of arcuate grooves defined in the rotating assembly;

a pair of curved racks disposed one each in the arcuate grooves for movement therein;

a pair of motors having drive gears thereon supported by the rotating assembly with the drive gears each being in mesh with the gears of one of the curved racks;

a pair of deployment arms attached one each to each curved rack for movement therewith relative to the rotating assembly;

means to radially extend and retract the deployment arms as a function of the position thereof relative to the rotatable assembly;

an extendable and retractable length of track attached at each end thereof to a deployment arm;

a pair of latches movably mounted on the mounting means for movement to retract and deployment modes;

a pair of latch members carried one each on the deployment arms and adapted to engage a corresponding latch when oriented in the retract mode; and means to selectively move the latches into the deployment and retract modes.

22. A traction apparatus as set forth in claim 21 in which the means to radially extend and retract the deployment arms comprise a solenoid, a pair of telescoping members movable relative to one another by the solenoid means attached thereto, and biasing means to urge the telescoping members into the radially extended position attached to the telescoping members.

23. A traction apparatus for a vehicle wheel, the apparatus comprising:

mounting means adapted to be secured adjacent a rotatable vehicle wheel;

an outer assembly extending circumferentially around the mounting means and journaled thereto at a position substantially concentric to the center of rotation of the vehicle wheel;

a pair of arcuate cylinders defined in the outer rotating assembly and having vent openings defined at each end thereof;

an arcuate piston positioned for sliding movement in each arcuate cylinder;

a pair of deployment arms mounted one each on each arcuate piston and extending radially outward therefrom;

a length of expandable and retractable track supported on each end by a deployment arm;

valve means selectively connectable to the vent means at an end of each of the arcuate cylinders to induce movement of the pistons therein in opposite rotational direction; and means to radially extend and retract the deployment arms as a function of the position of the deployment arms relative to the rotatable outer assembly.

24. A traction apparatus as set forth in claim 23 in which the means to radially extend and retract the deployment arms comprise a pair of telescoping members comprising at least a portion of each deployment arm, biasing means urging the telescoping members to a radially extended position, a cylinder defined in each deployment arm, a piston disposed in each cylinder, and conduit means communicating with the cylinder and adapted to provide a fluid under pressure to urge the telescoping members to a radially retracted position.

25. A method of operating a traction device for a wheeled vehicle comprising:

mounting a fixed support adjacent a rotatable vehicle wheel, rotating an outer assembly concentrically with the rotation of the vehicle wheel around a journal between the outer assembly and the mounting means;

extending a length of track to encircle the vehicle wheel by moving a pair of deployment arms in opposite rotational directions around circular paths substantially concentric to the rotation of the outer assembly, the arms being moved by spring means bearing thereon;

moving the deployment arms radially inward to engage the attached track to the rotating wheel upon substantial completion of the encirclement thereof by the track; and retracting the length of track by first moving the deployment arms radially outward and then in opposite rotational directions to compress and position the track at a position radially spaced from the rotating wheel, the spring means being compressed by latching one of the deployment arms to the fixed support and causing the rotating wheel to at least partially retract the track and compress the spring means.

26. A method of operating a traction device for a wheeled vehicle as set forth in claim 25 in which the deployment arms are moved radially inward and outward from the wheel by means of a cam defined on the rotating outer assembly and a cam follower carried on the deployment arms.

27. A method of operating a traction device for a wheeled vehicle as set forth in claim 26 in which the deployment arms are moved inward and outward independent of the cam follower and cam by distortion of compliance biasing means in response to radial forces applied to the deployment arms.

28. A method of operating a traction device for a wheeled vehicle as set forth in claim 25 in which the deployment arms are moved at least one of the radial inward and outward movements by means of a solenoid positioned between telescoping members included in the deployment arms.

29. A method of operating a traction device for a wheeled vehicle as set forth in claim 28 in which the deployment arms are moved inward and outward independent of the solenoid by distortion of compliance biasing means in response to radial forces applied to the deployment arms.

30. A method of operating a traction device for a wheeled vehicle as set forth in claim 25 in which the deployment arms are moved in at least one of the radial inward and outward directions by means of a fluid working against a piston in a cylinder connected between telescoping members included on the deployment arms.

31. A method of operating a traction device for a wheeled vehicle as set forth in claim 30 in which the deployment arms are moved inward and outward independent of the fluid by distortion of compliance biasing means in response to radial forces applied to the deployment arms.

32. A method of operating a traction device for a wheeled vehicle comprising:

mounting a fixed support adjacent a rotatable vehicle wheel, rotating an outer assembly concentrically with the rotation of the vehicle wheel around a journal between the outer assembly and the mounting means;

extending a length of track to encircle the vehicle wheel by moving a pair of deployment arms in opposite rotational directions around circular paths substantially concentric to the rotation of the outer assembly;

moving the deployment arms radially inward to engage the attached track to the rotating wheel upon substantial completion of the encirclement thereof by the track; and retracting the length of track by first moving the deployment arms radially outward and then in opposite rotational directions to compress and position the track at a position radially spaced from the rotating wheel, at least one of the movements of the deployment arms around the circular path to extend or retract the track being moved by at least one piston operably connected to the deployment arms and positioned in a cylinder defined within the outer assembly, and by fluid means selectively connectable to the interior of the cylinder to urge the piston in the desired path of travel.

33. A method of operating a traction device for a wheeled vehicle as set forth in claim 32 in which the deployment arms are moved radially inward and outward from the wheel by means of a cam defined on the rotating outer assembly and a cam follower carried on the deployment arms.

34. A method of operating a traction device for a wheeled vehicle as set forth in claim 33 in which the deployment arms are moved inward and outward independent of the cam follower and cam by distortion of compliance biasing means in response to radial forces applied to the deployment arms.

35. A method of operating a traction device for a wheeled vehicle as set forth in claim 32 in which the deployment arms are moved at least one of the radial inward and outward movements by means of a solenoid positioned between telescoping members included in the deployment arms.

36. A method of operating a traction device for a wheeled vehicle as set forth in claim 35 in which the deployment arms are moved inward and outward independent of the solenoid by distortion of compliance biasing means in response to radial forces applied to the deployment arms.

37. A method of operating a traction device for a wheeled vehicle as set forth in claim 32 in which the deployment arms are moved in at least one of the radial inward and outward directions by means of a fluid working against a piston in a cylinder connected between telescoping members included on the deployment arms.

38. A method of operating a traction device for a wheeled vehicle as set forth in claim 37 in which the deployment arms are moved inward and outward independent of the fluid by distortion of compliance biasing means in response to radial forces applied to the deployment arms.

39. A metod of operating a traction device for a wheeled vehicle cmprising:

mounting a fixed support adjacent a rotatale vehicle wheel, rotating an outer assembly concenrically with the rotation of the vehicle wheel around a ournal between the outer assembly and the mounting means;

extending a length of track to encircle the vehicle wheel by moving a pair of deployment arms in opposite rotational directions around circular paths substantially concentric to the rotation of the outer assembly;

moving the deployment arms radially inward towards the wheel by means of a cam defined on the rotating outer assembly and a cam follower carried on the deployment arms to engage the attached track to the rotating wheel upon substantial completion of the encirclement thereof by the track;

retracting the length of track by first moving the deployment arms radially outward and then in opposite rotational directions to compress and position the track at a position radially spaced from the rotating wheel, the deployment arms being moved radially outward from the wheel by means of a cam defined on the rotating outer assembly and a cam follower carried on the deployment arms; and the deployment arms also being moved inward and outward independent of the cam follower and cam by distortion of compliance biasing means in response to radial forces applied to the deployment arms.

40. A method of operating a traction device for a wheeled vehicle comprising:

mounting a fixed support adjacent a rotatable vehicle wheel, rotating an outer assembly concentrically with the rotation of the vehicle wheel around a journal between the outer assembly and the mounting means;

extending a length of track to encircle the vehicle wheel by moving a pair of deployment arms in opposite rotational directions around circular paths substantially concentric to the rotation of the outer assembly;

moving the deployment arms radially inward to engage the attached track to the rotating wheel upon substantial completion of the encirclement thereof by the track, the deployment arms being moved in at least one of the radial inward and outward movements by means of a solenoid positioned between telescoping members included in the deployment arms; and retracting the length of track by first moving the deployment arms radially outward and then in opposite rotational directions to compress and position the track at a position radially spaced from the rotating wheel.

41. A method of operating a traction device for a wheeled vehicle as set forth in claim 40 in which the deployment arms are moved inward and outward independent of the solenoid by distortion of compliance biasing means in response to radial forces applied to the deployment arms.

42. A method of operating a traction device for a wheeled vehicle comprising:

mounting a fixed support adjacent a rotatable vehicle wheel, rotating an outer assembly concentrically with the rotation of the vehicle wheel around a journal between the outer assembly and the mounting means;

extending a length of track to encircle the vehicle wheel by moving a pair of deployment arms in opposite rotational directions around circular paths substantially concentric to the rotation of the outer assembly;

moving the deployment arms radially inward to engage the attached track to the rotating wheel upon substantial completion of the encirclement thereof by the track, the deployment arms being moved in at least one of the radial inward and outward directions by means of a fluid working against a piston in a cylinder connected between telescoping members included on the deployment arms; and retracting the length of track by first moving the deployment arms radially outward and then in opposite rotational directions to compress and position the track at a position radially spaced from the rotating wheel.

43. A method of operating a traction device for a wheeled vehicle as set forth in claim 42 in which the deployment arms are moved inward and outward independent of the fluid by distortion of compliance biasing means in response to radial forces applied to the deployment arms.

* * * * *